(12) United States Patent
Kannan et al.

(10) Patent No.: US 8,904,388 B2
(45) Date of Patent: Dec. 2, 2014

(54) SCRIPTING LANGUAGE EXECUTOR SERVICE FOR APPLICATIONS

(71) Applicant: VCE Company LLC, Richardson, TX (US)

(72) Inventors: Hariharan Kannan, San Jose, CA (US); Akshaya Mahapatra, San Jose, CA (US); David Olszewski, Campbell, CA (US); John J. Mulqueeney, Jr., San Bruno, CA (US)

(73) Assignee: VCE Company, LLC, Richardson, TX (US)

(*) Notice: Subject to any disclaimer, the term of this patent is extended or adjusted under 35 U.S.C. 154(b) by 200 days.

(21) Appl. No.: 13/738,673

(22) Filed: Jan. 10, 2013

(65) Prior Publication Data
US 2014/0196029 A1 Jul. 10, 2014

(51) Int. Cl.
*G06F 9/455* (2006.01)
(52) U.S. Cl.
CPC .................................. *G06F 9/45504* (2013.01)
USPC .............................. 718/1; 719/314; 719/320
(58) Field of Classification Search
CPC G06F 9/45533; G06F 9/5077; G06F 9/45537
See application file for complete search history.

(56) References Cited

U.S. PATENT DOCUMENTS

| 7,558,723 | B2* | 7/2009 | Traut .............................. 703/24 |
| 7,685,251 | B2* | 3/2010 | Houlihan et al. ............. 709/215 |
| 7,870,153 | B2* | 1/2011 | Croft et al. .................... 707/781 |
| 7,949,677 | B2* | 5/2011 | Croft et al. .................... 707/781 |
| 7,954,150 | B2* | 5/2011 | Croft et al. ...................... 726/21 |
| 8,010,679 | B2* | 8/2011 | Low et al. ..................... 709/227 |
| 8,429,649 | B1* | 4/2013 | Feathergill et al. ............... 718/1 |
| 8,447,963 | B2* | 5/2013 | Kraus et al. ....................... 713/1 |
| 8,612,971 | B1* | 12/2013 | Fitzgerald et al. ................ 718/1 |
| 2010/0042988 | A1* | 2/2010 | Lundin et al. ................. 717/176 |
| 2014/0181807 | A1* | 6/2014 | Fonseca et al. .................... 718/1 |

OTHER PUBLICATIONS

Sugiki et al. "Kumoi: A High-Level Scripting Environment for Collective Virtual Machines", 2010 IEEE, pp. 322-329.*
Uhruski et al. "Multi-Agent Computing System in a Heterogeneous Network", 2002 IEEE, 6 pages.*

* cited by examiner

*Primary Examiner* — Van Nguyen
(74) *Attorney, Agent, or Firm* — Polsinelli PC (57) ABSTRACT

A method and system for executing scripts on virtual machines is provided. The system includes an executor service that accepts scripts, parameters, authentication information from another process that needs to invoke a script on a target virtual machine (or group of virtual machines). The executor service remains running even after a script has completed execution. The executor service accepts any number of scripts and places them in a command queue. Agents running on the target virtual machine(s) check-in with the executor service to receive scripts from the command queue. Also, the executor service may directly invoke a script using a persistent connection to a virtual machine management center.

18 Claims, 4 Drawing Sheets

SCRIPTING LANGUAGE EXECUTOR SERVICE FOR APPLICATIONS

BACKGROUND OF THE INVENTION

1. Field of the Invention

Embodiments of the present invention generally relate to a method for remotely executing scripting language on computer systems.

2. Description of the Related Art

Software developers use general-purpose programming languages, such as Java or C++ to write software applications in a wide variety of application domains due to the flexibility afforded by such programming languages. In contrast, scripting languages, such as PowerShell or bash, are typically used by system administrators to quickly complete administrative tasks and automate tasks on computer systems. For example, system administrators can write scripts to install software, change configurations and settings, launch software, or even execute additional scripts. As such, there is a demand for solutions that combine software applications and scripts, which are typically supported by very different support stacks (e.g., compiled language vs. run-time interpreter).

SUMMARY OF THE INVENTION

Embodiments of the present disclosure provide a method for executing a script on a plurality of virtual machines. The method includes loading, by a first process, a library configured to connect to a virtual management center and enable remote execution of a script on the plurality of virtual machines. The method includes establishing a connection to the virtual management center based on the loaded library. The method further includes receiving, from a second process, a command request having a script and specifying at least one target virtual machine of the plurality of virtual machines on which to invoke the script. The method includes responsive to determining an agent is available on the target virtual machine, storing the received command request associated with the target virtual machine in a command queue. The method includes responsive to determining an agent is not available on the target virtual machine, invoking execution of the script on the target virtual machine using the connection to the virtual management center.

Embodiments of the present disclosure provide a system for executing scripts on a plurality of virtual machines. The system includes one or more computer processors, a memory containing a program which, when executed by the one or more computer processors, is configured to perform an operation. The operation includes loading, by a first process executing in the computer processor, a library configured to connect to a virtual management center and enable remote execution of a script on the plurality of virtual machines. The operation further includes establishing a connection to the virtual management center based on the loaded library, and receiving, from a second process executing in the computer processor, a command request. The command request may have a script and specifying at least one target virtual machine of the plurality of virtual machines on which to invoke the script. The operation further includes, responsive to determining an agent is available on the target virtual machine, storing the received command request associated with the target virtual machine in a command queue. The operation includes responsive to determining an agent is not available on the target virtual machine, invoking execution of the script on the target virtual machine using the connection to the virtual management center.

Embodiments of the present disclosure provide a non-transitory computer-readable storage medium having computer-readable program code embodied therewith. The computer-readable program code includes computer-readable program code configured to load, by a first process, a library configured to connect to a virtual management center and enable remote execution of a script on a plurality of virtual machines. The computer-readable program code further includes computer-readable program code configured to establish a connection to the virtual management center based on the loaded library, and computer-readable program code configured to receive, from a second process, a command request having a script and specifying at least one target virtual machine of the plurality of virtual machines on which to invoke the script. The computer-readable program code further includes computer-readable program code configured to, responsive to determining an agent is available on the target virtual machine, store the received command request associated with the target virtual machine in a command queue. The computer-readable program code includes computer-readable program code configured to, responsive to determining an agent is not available on the target virtual machine, invoke execution of the script on the target virtual machine using the connection to the virtual management center.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present invention provide a method and system for executing scripts on virtual machines. The system includes an executor service that accepts scripts, parameters, authentication details, and other information from another process that needs to invoke a script on a target virtual machine (or group of virtual machines). The executor service may remain running even after a script has completed execution. The executor service may accept any number of scripts and place them in a command queue. Agents running on the target virtual machine(s) may periodically check-in with the executor service to receive scripts from the command queue. Further, the executor service may directly invoke a script on target virtual machine(s) using a persistent connection to a virtual machine management center.

Figure 1:
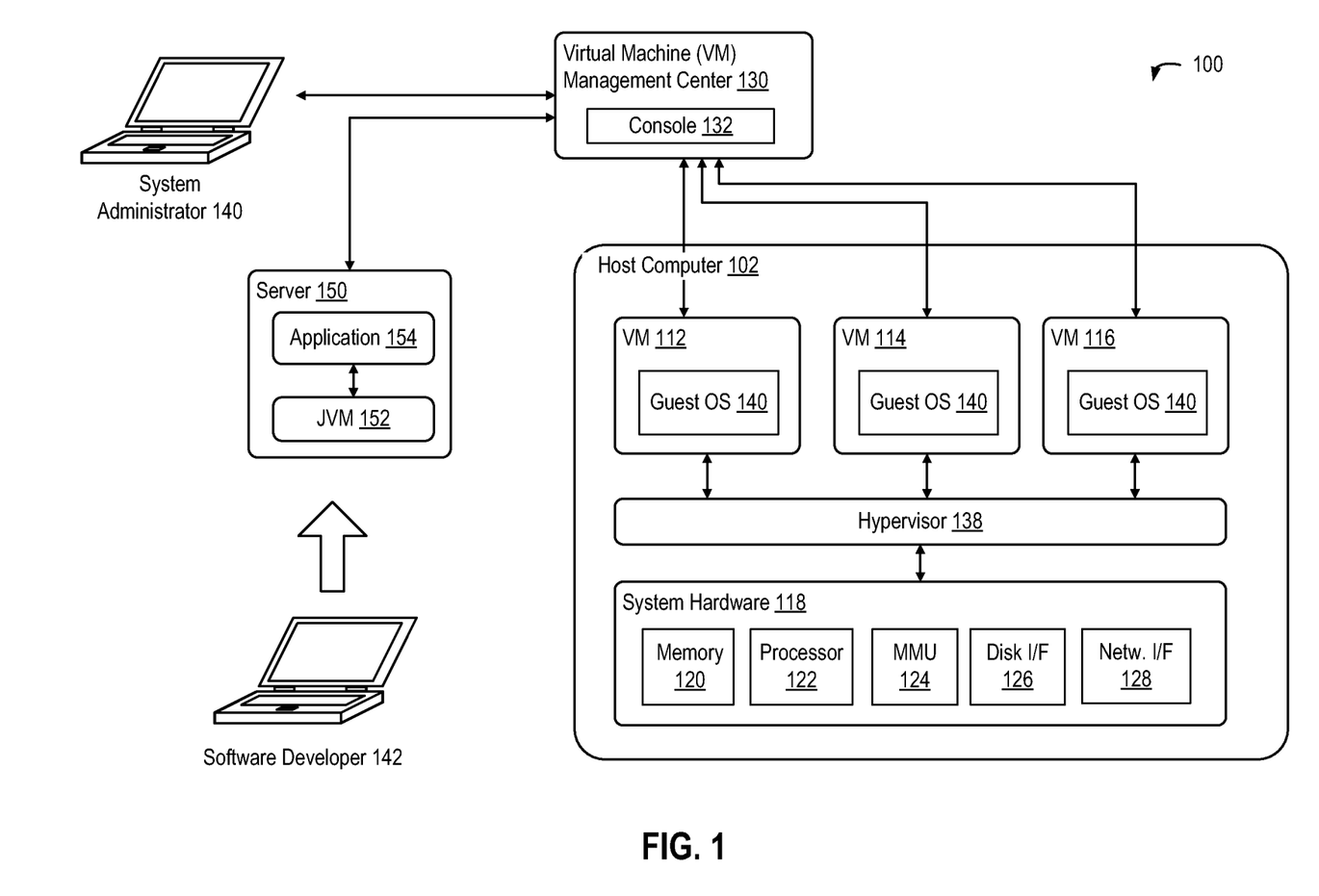
FIG. 1 is a block diagram that illustrates a virtualized computer system with which one or more embodiments of the present invention may be utilized.

FIG. 1 is a block diagram that illustrates a computing environment 100 with which one or more embodiments of the present invention may be utilized. The computing environment 100 includes a host computer 102 (sometimes referred to as a server) is configured to support a virtualized environment comprised of one or more virtual machines.

As in conventional computer systems, the host computer 102 includes system hardware 118 and system software. The system hardware 118 generally includes memory 120, a processor 122, some form of memory management unit (MMU) 124 (which may be integrated with the processor 122), a disk interface 126, and a network interface 128. The memory 120 stores data and software such as an operating system and currently running application programs. MMU 124 is configured to manage a virtual memory for processes running in host computer 102. The processor 122 may be a single processor, or two or more cooperating processors in a known multiprocessor arrangement. Examples of disk interface 126 are a host bus adapter and a network file system interface. An example of network interface 128 is a network adapter, also referred to as a network interface controller (NIC). In some embodiments, a plurality of NICs is included as the network interface 128. It should further be recognized that system hardware 118 also includes, or is connected to, conventional registers, interrupt handling circuitry, a clock, etc., which for sake of simplicity, are not shown in the figures.

One or more virtual machines (VMs), illustratively depicted as VMs 112, 114, and 116, are configured within the host computer 102 and share the hardware resources of the host computer 102. Each virtual machine typically includes a guest operating system (OS) 140 and virtualized system hardware (not shown), which includes one or more virtual CPUs, virtual system memory, one or more virtual disks, one or more virtual devices, etc., all of which are implemented to emulate the corresponding components of an actual computer.

The virtual machines run on top of a hypervisor 138 (sometimes referred to as a virtual machine monitor or VMM), which is a software interface layer that abstracts system hardware 118 into virtualized hardware, thereby enabling sharing of system hardware 118 of the host computer 102 amongst the virtual machines. The hypervisor 138 acts as an interface between VM 112 and the system hardware 118 for executing VM-related instructions and for transferring data to and from memory 120, processor(s) 122, disk interface 126, etc. The hypervisor 138 may run on top of an operating system of the host computer 102 or may run directly on hardware components of the host computer 102.

In one embodiment, the computing environment 100 includes a virtual machine management center 130 configured to centrally manage the VMs 112, 114, 116. For example, a system administrator 140 may interact the VM management center 130 (e.g., via administrative client or console 132) to start VM, pause a VM, take a snapshot of a VM's state, allocate resources for a VM, or monitor metrics for CPU or memory utilization metrics. In some embodiments, the VM management center 130 may be configured to remotely invoke a script on a VM to perform one or more administrative tasks on the VM. In some implementations, the guest OS 140 running on a virtual machine (e.g., VM 112) may have a plug-in or extension installed (sometimes referred to as a VM toolkit) that allows the VM management center 130 to access and manipulate the VM. One example of a VM management center 130 is a vCenter(R) Server made available by VMware, Inc. In one embodiment, the VM management center 130 includes a console 132 configured to allow administrative access to the VM management center 130 and its VM management functionality, described above.

In one embodiment, the computing environment 100 includes a server 150 having a runtime environment and an application 154 executing thereon. In the embodiments illustrated herein, the runtime environment is a Java Virtual Machine (JVM) 152, although it should be recognized that other runtime environments and/or applications executing on top of the guest OS may be used without departing from the scope of the teachings herein. The embodiments presented should therefore not be interpreted to be exclusive or limiting, but rather exemplary or illustrative.

In one embodiment, the application 154 may be an infrastructure application configured to programmatically modify one or more VMs 112, 114, and 116. However, in many cases, software products running on the VMs 112, 114, and 116 may not provide a native application programming interface (API) that can be used to perform administrative operations. In the embodiments described herein, a native API refers to an interface or framework that makes certain functionality or commands available to third-party applications (e.g., application 154) in a particular programming language or software framework. For example, a software product running on VMs 112, 114, 116, may not provide a native Java API that can be used by the application 154 to perform the desired operations.

To solve this problem, software developers 142 use scripting languages relied on by system administrators 140 to perform the desired operations. Applications such as the application 154—which may have been developed using a general-purpose programming language, such as Java—are configured to execute one or more scripts written in a scripting language. In the embodiments illustrated herein, the scripting language is PowerShell, although it should be recognized that other scripting languages may be used without departing from the scope of the teachings herein. Again, the embodiments presented should therefore not be interpreted to be exclusive or limiting, but rather exemplary or illustrative. Table 1 illustrates a sample PowerShell script for setting network settings on a virtual machine.

TABLE 1

Sample PowerShell script

```
Function setDNS($HostCredential, $GuestCredential,
    $VMname, $macAddress, $SNM, $DNS, $GW) {
    $remoteScript = "'$NICs = Get-WMIObject
        Win32_NetworkAdapterConfiguration |
        where{'$_.MACAddress -eq ""$macAddress""'};
        Foreach('$NIC in '$NICs) {
        '$DNSServers=""$DNS"";
        '$NIC.SetDNSServerSearchOrder('$DNSServers);
        '$NIC.SetGateways(""$GW"");} ";
    $ipSetScript="$remoteScript"
    $result = Invoke-VMScript -VM $VMname -
        HostCredential $HostCredential -GuestCredential
        $GuestCredential -ScriptType powershell -
        ScriptText $ipSetScript -ErrorVariable err
    if($err.count -gt 0) {
        Write-Host "_ERROR_:Failed to set IP and
            Network on VM: $VMname"
        exit
    }
}
# Load A Library
Add-PSSnapin VMware.VimAutomation.Core;
# Connect to vCenter
Connect-VIServer "172.22.5.51" -User "myVCenterLoginId"
    -Password "myVCenterPassword" -Protocol https
```

TABLE 1-continued

Sample PowerShell script

```
$HostCredential = new-object -typename
    System.Management.Automation.PSCredential
    -argumentlist "myESXUser", "mySecureHostPassword"
$GuestCredential = new-object -typename
    System.Management.Automation.PSCredential
    -argumentlist "myVMGuestUser",
    "mySecureGuestPassword"
setDNS $HostCredential $GuestCredential "TestVM"
    "00:50:56:a5:7c:c5" "172.22.5.56" "255.255.255.0"
    "172.22.96.5" "172.22.5.1"
Disconnect-VIServer -Server "172.22.5.51"
```

In one embodiment, to execute a PowerShell script, the application 154 may be configured to spawn a process, and execute a PowerShell script from the spawned process. After the PowerShell script is exited, control is returned to the application 154. Table 2 illustrates sample Java code for one example technique for executing a PowerShell script.

TABLE 2

Sample Java code for executing a PowerShell script

```
public static void executePowerShellScript( ) {
    String[ ] cmd = {
    "C:\Windows\SysWOW64\WindowsPowerShell\v1.0\powershell.exe",
        "ScriptToSetDNS.ps1"
    }
    try {
        Runtime runtime = Runtime.getRuntime( );
        final Process process = runtime.exec(cmd);
        Callable<Integer> call = new Callable<Integer>( ) {
            public Integer call( ) throws Exception {
                process.waitFor( );
                return process.exitValue( );
            }
        };
        ExecutorService service =
            Executors.newSingleThreadExecutor( );
        // submit the command's call and get the result from a
        Future<Integer> futureResultOfCall =
            service.submit(call);
        try {
            processExitValue = futureResultOfCall.get(timeOut,
                TimeUnit.MINUTES);
        } catch (Exception ex) {
            // Report error
        } finally {
            process.destroy( );
            service. shutdown( );
        }
    }
}
```

As shown above in Table 1, the PowerShell script may load one or more libraries relied on by the script. However, loading the libraries may add additional execution time to the script. If an application needed to execute several scripts, each call would be an independent process that needs to wait until libraries are loaded for PowerShell. Each invocation of a PowerShell script performs functions (e.g., establish a connection, load libraries) that are not usable by any subsequent invocations. Accordingly, embodiments of the present invention provide a system for executing a script on a remote VM.

Figure 2:
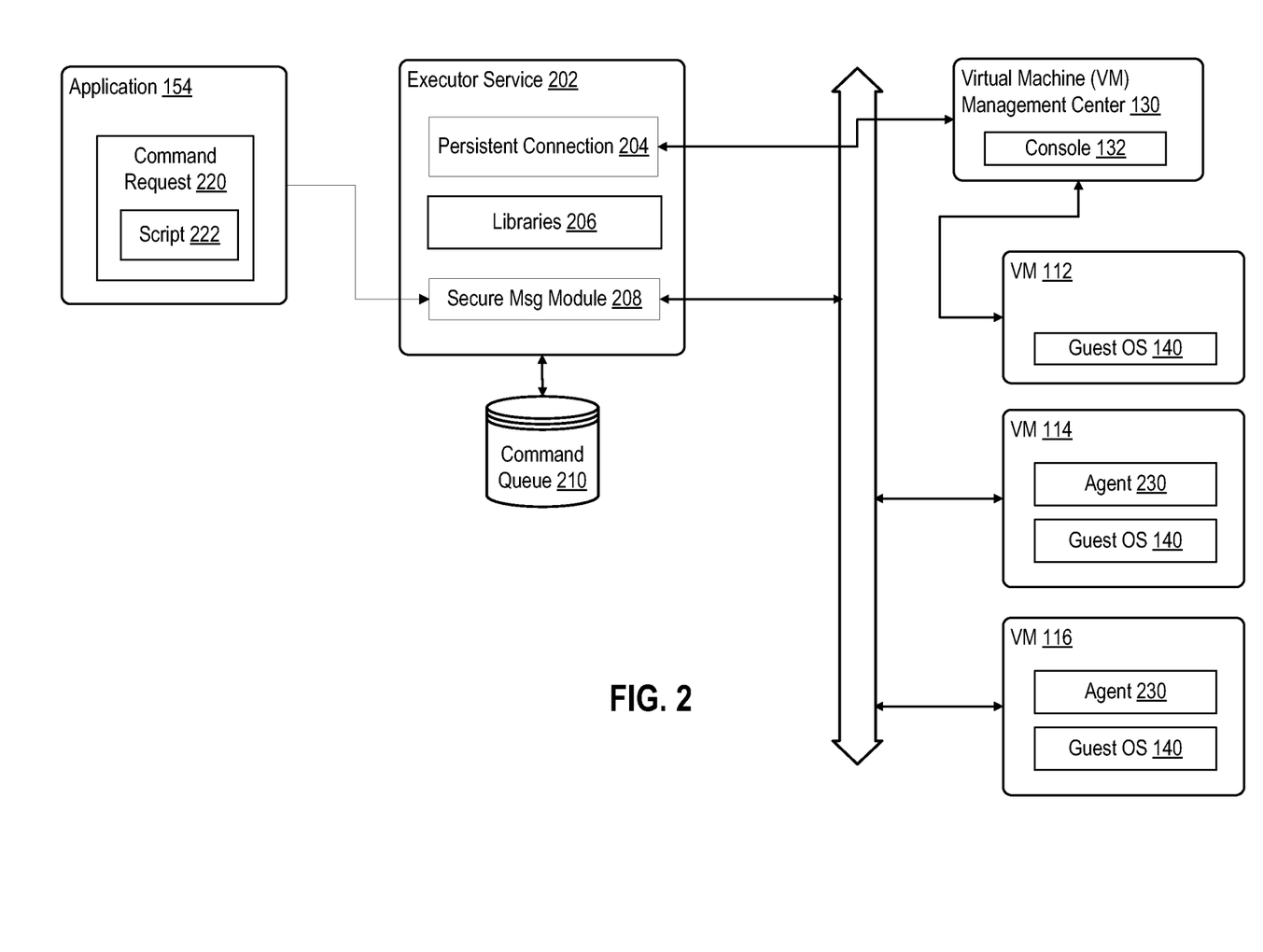
FIG. 2 is a block diagram that illustrates an executor service for executing scripts on virtual machines, according to one embodiment of the present invention.

FIG. 2 is a block diagram that illustrates an executor service 202 for executing scripts on virtual machines, according to one embodiment of the present invention. The executor service 202 is configured to receive from the application 154 a command request 220 for one or more target virtual machines (e.g., VMs 112, 114, 116). In one embodiment, the command request 220 may include a script 222 configured to be invoked on the designated target virtual machine. The script 222 may be configured to perform one or more automated system administrative tasks, such as changing network addresses, adding DNS settings, initiating software installation, etc.

In one embodiment, the executor service 202 includes one or more libraries 206 configured to facilitate execution of a script on a target VM. The libraries 206 may include an automation library that provides access to the VM management center 130, such as a PowerCLI framework made available from VMware, Inc. In one embodiment, the executor service 202 further includes a persistent connection 204 to VM management center 130 that may be used to automate administration of VMs under the control of the VM management center 130. The executor service 202 may be configured to invoke a script 222 of a command request 220 on one or more target VMs using the persistent connection 204 to VM management center 130.

In one embodiment, the executor service 202 is configured to store the received command requests 220 and provide the command request to target VMs when an agent 230 executing on each VM periodically poll with the executor service 202 for any command requests to be fulfilled. In one embodiment, the executor service 202 includes a command queue 210 configured to store one or more command requests 220 received from applications. The command queue 210 is configured to allow retrieval of the command requests 220 based on a given target virtual machine (i.e., indexed by target VM). In some embodiments, the command queue 210 may be configured to maintain status of each command request 220 and store any reported status (e.g., script output) for the requesting applications.

In one embodiment, the executor service 202 further includes a secure message module 208 configured to secure the channel of communication between requesting applications and the executor service 202, as well as channels of communication between the executor service 202 and target VMs. For example, the secure message module 208 may be configured to decrypt command requests 220 received from authorized applications and encrypt for status messages to the applications. In another example, the secure message module 208 may be configured to encrypt command requests transmitted to one or more target VMs, as well as decrypt responses from the target VMs.

Figure 3:
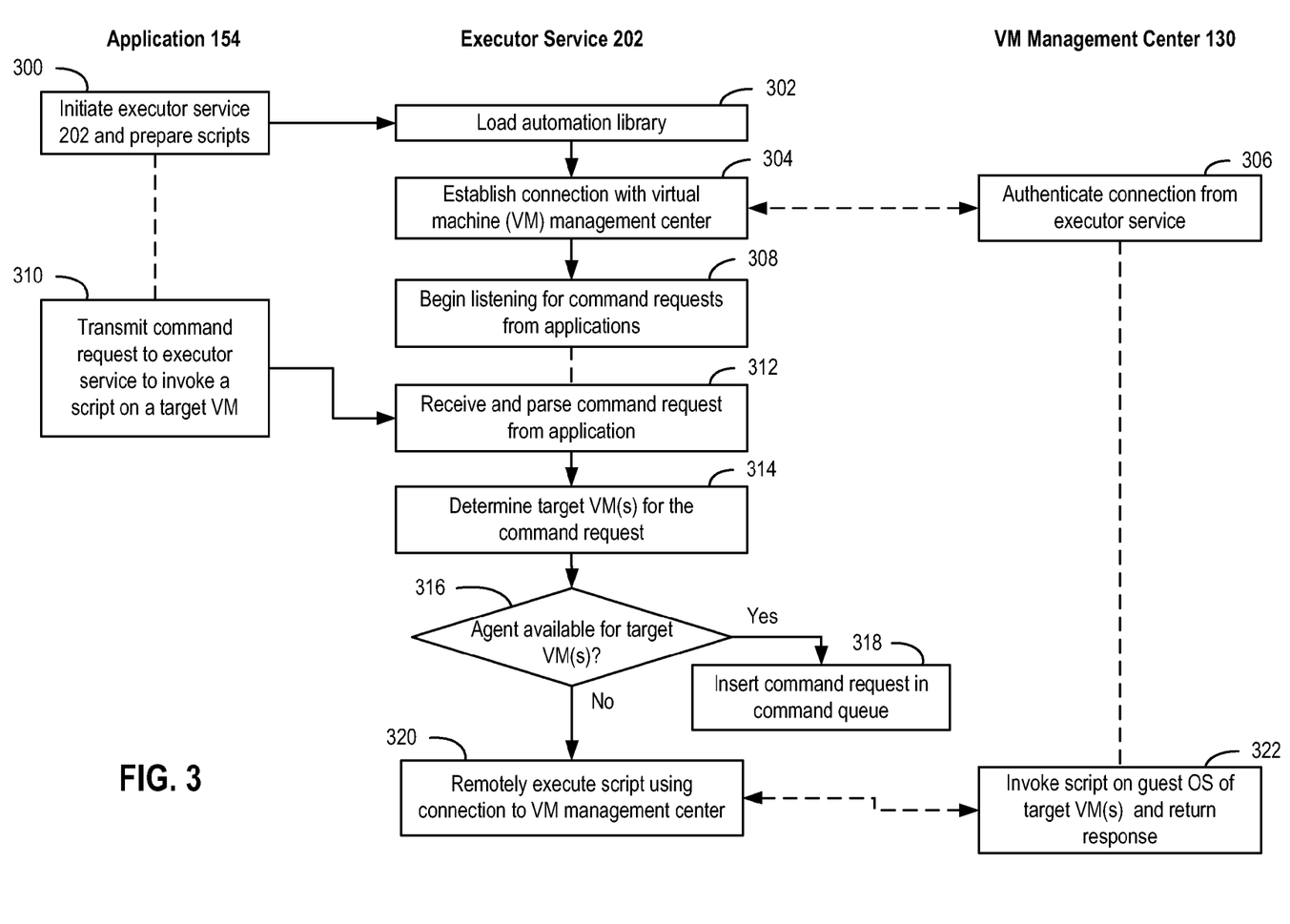
FIG. 3 is a flow diagram that illustrates steps for a method of executing scripts on a plurality of virtual machines, according to one embodiment of the present invention.

FIG. 3 is a flow diagram that illustrates steps for a method of executing scripts on a plurality of virtual machines, according to one embodiment of the present invention. As shown, the method begins at step 300, where an application, such as the Java application 154, initiates the executor service 202 and prepares one or more scripts (e.g., script 222) to be executed on one or more target VMs.

At step 302, where the executor service 202 launches and loads one or more libraries 206 configured to facilitate invocation of scripts on remote VMs, such as an automation library or framework. It should be appreciated that the libraries 206 are loaded as a one-time execution time cost even though numerous script invocations may be performed, thereby significantly reducing the execution time over traditional techniques.

At step 304, the executor service 202 establishes a connection with the VM management center 130. At step 306, the VM management center 130 authenticates the connection from the executor service 202. In some embodiments, the executor service 202 uses administrative credentials (e.g., root username, password) and a pre-determined network address of the VM management center 130 to establish a connection 204 to the VM management center 130. It should be appreciated that the persistent connection 204 may be retained through numerous script invocations, rather than connecting and disconnecting with the VM management center 130 upon each invocation.

At step 308, upon loading libraries 206 and establishing a persistent connection 204 with the VM management center 130, the executor service 202 begins listening for command requests from applications.

At step 310, the Java application 154 transmits a command request 220 to the executor service 202 to invoke a script 222 on a target VM. In one embodiment, the command request may include a plurality of fields, such as a PowerShell script 222 configured to be executed on a target VM (or group of VMs), parameters (if suitable), and authentication information needed to invoke the script on the target VM(s). An example of a command request 220 organized in a structured format is shown below in Table 3.

TABLE 3

Example of a Command Request

```
<PowerShellCommand>
  <CommandText>
    Get-WMIObject Win32_NetworkAdapterConfiguration |
    Foreach($NIC in $NICs) { $DNSServers=""192.22.5.51"";
    $NIC.SetDNSServerSearchOrder($DNSServers);
    $NIC.SetGateways(""192.22.5.1"");} ";
  </CommandText>
  <OperationMode>MultiCast</OperationMode>
  <TargetVirtualMachine>"192.22.5.5*"</TargetVirtualMachine>
</PowerShellCommand>
```

As shown, the field CommandText includes string text of a PowerShell script to be executed on a target machine specified by a target identifier, e.g., the TargetVirtualMachine field. In this example, the command request specifies that the CommandText script is to be executed on a plurality of target VMs, as identified by a network address string (e.g., "192.22.5.5*"). In one embodiment, the command request may target a plurality of virtual machines using multicast and broadcast operation modes, described later.

Referring back to FIG. 3, at step 312, the executor service 202 receives and parses the command request from the application 154. In one embodiment, the executor service 202 uses the secure message module 208 to authenticate the command request and ensure that the command requests are from authorized entities. It should be appreciated that any channels of communication between requesting applications and the executor service (e.g., command requests and status requests) and the executor service and agents 230 (e.g., check-in requests and responses) may be run through the secure message module 208 and may be omitted from further discussion.

At step 314, the executor service 202 determines one or more target VMs specified by the command request. A command request may specify a target virtual machine to execute a given script using a variety of ways. In one embodiment, the executor service 202 may determine the command request specifies a "unicast" mode of operation that targets a single VM to receive the command request. In some embodiments, the single target VM may be identified by name or by network address (e.g., IP address). The executor service 202 may further determine that the command request specifies a "multicast" mode of operation that targets a group of VMs to receive the command. Under "multicast," the target VMs may be specified by a wildcard expression of names or network addresses (e.g., "172.22.1.*"). The executor service 202 may also determine that the command requests specifies a "broadcast" mode of operation that targets all VMs in the system (e.g., computing environment 100) to receive the command.

At step 316, the executor service 202 determines whether an agent is available for the target VM(s). In some embodiments, the executor service 202 may be initiated (e.g., by application 154) with an enabled "agent" option that specifies that the executor service 202 should function as a "message broker" to retain all command requests received from the application 154 and dispatch the command requests to polling VMs. At step 318, responsive to determining that an agent is available for the target VMs of the command request, the executor service 202 inserts the command request into the command queue 210.

In some embodiments, the executor service 202 may be initiated with a disabled "agent" option that specifies the executor service 202 should directly execute the command request on the target VM(s). At step 320, responsive to determining that an agent is not available for the target VM of the command request, the executor service remotely executes the script 222 of the command request using the connection 204 to the VM management center 130. In one implementation, the executor service 202 executes an "Invoke-VMScript" command that directs the VM management center 130 to remotely execute the specified script 222 using specified credentials for the target VM(s).

At step 322, the VM management center 130 invokes the script on the guest OS of the target VM(s) and returns a response, if suitable. While not shown in FIG. 3, it should be appreciated that the executor service 202 may receive the script response from the VM management center 130 that results from remote execution of the script 222. The executor service 202 may store the script response within the command queue 210 to later provide to the application 154, as described below in conjunction with FIG. 4.

It should further be appreciated that, in some embodiments, command requests may specify on an individual basis whether a given command request should be saved to the command queue or directly executed. As such, certain command requests may be executed directly on a target VM lacking an agent 230 (as illustrated by VM 112 in FIG. 2) and may be stored in the command queue 210 for other target VMs having an agent 230 (e.g., VM 114, 116 in FIG. 2)

Figure 4:
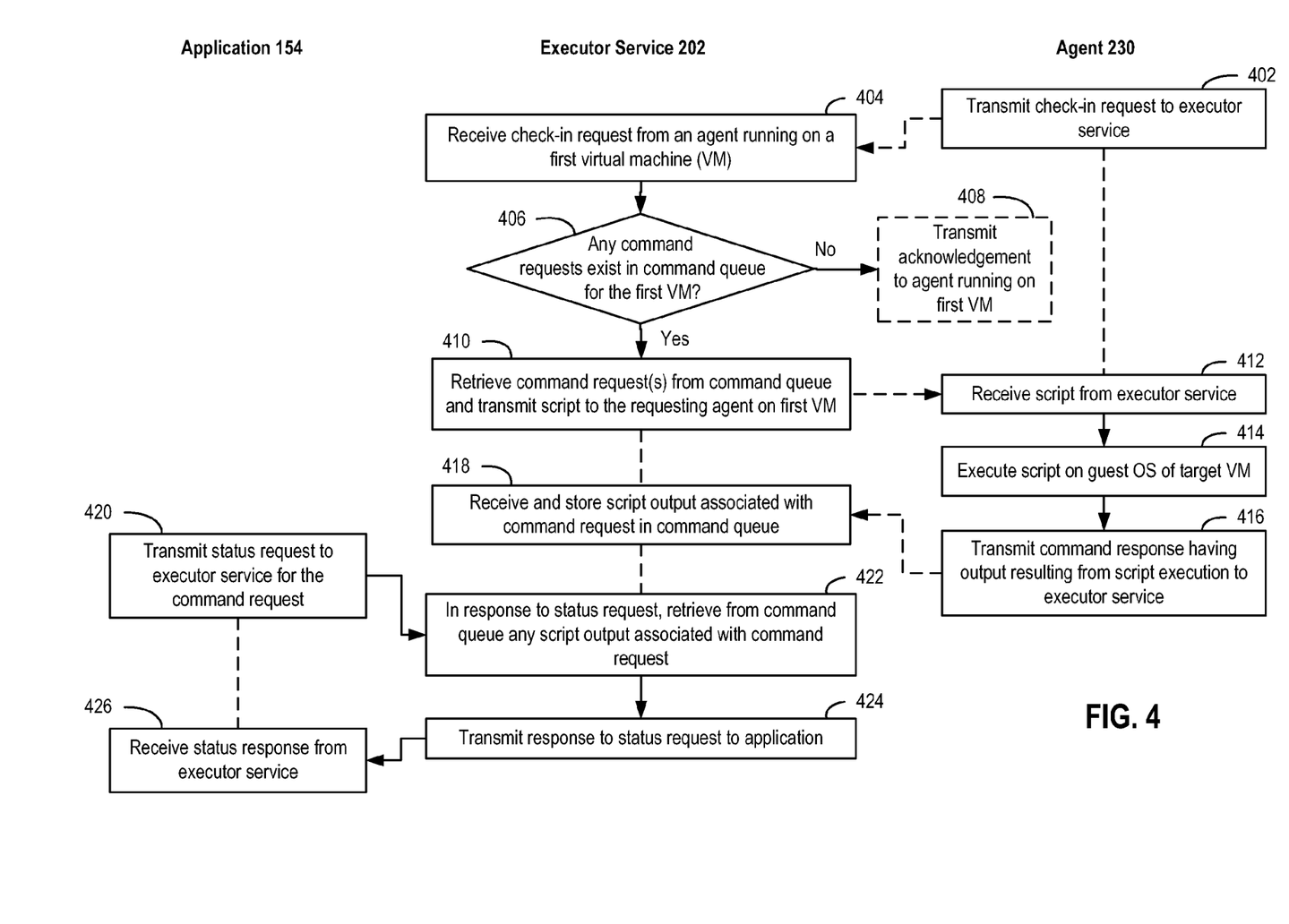
FIG. 4 is another flow diagram that illustrates steps for a method of executing scripts on a plurality of virtual machines, according to one embodiment of the present invention.

FIG. 4 is another flow diagram that illustrates steps for a method of executing scripts on a plurality of virtual machines, according to one embodiment of the present invention. As shown, the method begins at step 402, where an agent 230 executing on a virtual machine (e.g., VM 114) transmits a check-in request to the executor service 202 to detect if there are any commands available for the agent 230. In some embodiments, the agent 230 may transmit the check-in request on a periodical basis. The check-in request may include identifying information for the target VM 114 upon which the agent 230 runs (e.g., name, network address). In some embodiments, the check-in request may be encrypted to securely communicate with the executor service 202.

At step 404, the executor service 202 receives the check-in request from the agent 230 running on the VM 114. At step 406, the executor service 202 determines whether any command requests exist in command queue for the VM 114. In some embodiments, the executor service 202 queries the command queue for unicast command requests associated with the VM 114 originating the check-in request. In some embodiments, the executor service 202 may identify any multicast command requests associated with a group of VMs of which the VM 114 is a member of. In some embodiments, the executor service 202 may identify any broadcast command requests in the command queue.

At step 408, responsive to determining that there are no command requests in the command queue associated with the VM 114, the executor service 202 may optionally transmit an acknowledgement message to the agent 230 running on the VM 114. The acknowledgement message may acknowledge receipt of the check-in request (e.g., received at step 404) and confirm no scripts are available for the agent 230 to be executed on the VM 114.

Otherwise, at step 410, responsive to determining there are command requests in the command queue associated with the VM 114 checking in, the executor service 202 retrieves the command request(s) from the command queue and transmits the script to the requesting agent 230 in the VM 114. In some embodiments, the executor service 202 may modify the command queue to maintain a log record that the script associated with the command request has been transmitted to a particular target VMs. For example, in cases where the command request specifies a multicast or broadcast mode of operation, the executor service 202 may avoid re-transmitting duplicate scripts to target VMs based on the log record.

At step 412, the agent 230 running on the target VM receives the script 222 from the executor service. In some embodiments, the agent 230 may decrypt the received script to verify the script is an authentic command from an authorized entity (e.g., the executor service). At step 414, the agent 230 executes the script on the guest OS of the target VM. For example, using the example from Table 3, the agent 230 may execute a PowerShell script comprising commands to set the gateway and DNS settings as follows:

```
Get-WMIObject Win32_NetworkAdapterConfiguration | Foreach($NIC in
    $NICs) { $DNSServers="""192.22.5.51""";
    $NIC.SetDNSServerSearchOrder($DNSServers);
    $NIC.SetGateways("""192.22.5.1""");} ";
```

In some embodiments, the executed script may result in script output, such as verbose text output describing progress and status of the script execution. At step 416, the agent 230 running on a target VM transmits a command response to the executor service 202. The command response may include an acknowledgement that the script has been successfully executed on the target VM, and may include a copy of the script output resultant from executing the script on the target VM. In some embodiments, the command response may include an identifier that associates the command response with a corresponding command request at the executor service 202.

At step 418, the executor service 202 receives the command response from the agent 230 running on the target VMs. In some embodiments, the executor service 202 stores the script output associated with the command request within the command queue 210. In some embodiments, the executor service 202 updates the command queue 210 to indicate a status for the command request corresponding to the received command response to indicate the script has been executed on the target VM.

At step 420, the application 154 that initiated the original command request (e.g., at step 310) transmits a status request to the executor service 202 for an update regarding the command request. The status request may specify the command request for which status is sought using a unique identifier or other information. It should be appreciated that the application may transmit a status request not just for scripts scheduled for execution via the command queue (e.g., at step 318), but in addition, scripts directly invoked on a target VM (e.g., at step 320). In some embodiments, the application may periodically transmit a status request to the executor service 202, similar to the periodic polling by the agents 230.

At step 422, responsive to receiving the status request, the executor service determines the status of the command request based on information provided by the command queue. For example, the status of a command request may specify a script has been executed, is currently being executed, or has not yet been picked up by an agent 230 on a target VM. In some embodiments, the executor service retrieves from the command queue any script output associated with the command request indicated by the status request. In other embodiments, the executor service may retrieve information from the command queue regarding any new (e.g., since a last status request) status updates for the requesting application from any command requests.

At step 424, the executor service transmits a response to the status request to the application 154. In one some embodiments, the response to the status request may include any script output resultant from execution of the script on a given target VM(s). In some embodiments, the response to the status request may include status codes, error codes, or other return values resulting from invocation of the script at the target VM. At step 426, the application receives the status response from the executor service and may continue its execution, which may include transmission of additional command requests to the executor service 202.

Accordingly, embodiments of the present disclosure advantageously enable a software application to efficiently execute scripts on a plurality of virtual machines. Embodiments of the present disclosure reduce the amount of wait time for loading libraries need by the scripts. Further, for embodiments having agents running on the target VMs provides improved network security as less firewall ports need to be opened to run scripts on the virtual machines. Rather, ports may be opened between the executor service and the target virtual machines on which scripts need to be run.

Various embodiments of the present disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

While the foregoing is directed to embodiments of the present disclosure, other and further embodiments of the present disclosure may be devised without departing from the basic scope thereof, and the scope thereof is determined by the claims that follow.

What is claimed is:

1. A method for executing a script on a plurality of virtual machines, the method comprising:
   loading, by a first process, a library configured to connect to a virtual management center and enable remote execution of a script on the plurality of virtual machines;
   establishing a connection to the virtual management center based on the loaded library;
   receiving, from a second process, a command request having a script and specifying at least one target virtual machine of the plurality of virtual machines on which to invoke the script;
   responsive to determining an agent is available on the target virtual machine, storing the received command request associated with the target virtual machine in a command queue; and
   responsive to determining an agent is not available on the target virtual machine, invoking execution of the script on the target virtual machine using the connection to the virtual management center.

2. The method of claim 1, further comprising:
   responsive to receiving a check-in request from an agent executing in a virtual machine, determining whether any command requests associated with the virtual machine are available in the command queue; and
   transmitting, to the agent executing in the virtual machine, at least one script associated with the command requests retrieved from the command queue.

3. The method of claim 2, wherein the determining whether any command requests associated with the target virtual machine further comprises:
   identifying any command requests having a target identifier matching the virtual machine of the check-in request;
   identifying any command requests configured for multicast operation and having a target identifier matching at least a portion of the virtual machine of the check-in request; and
   identifying any command requests configured for broadcast operation.

4. The method of claim 1, further comprising:
   receiving, from the target virtual machine, script output resulting from execution of the script on the target virtual machine; and
   modifying the command queue to update a status of the command request and store the script output.

5. The method of claim 4, further comprising:
   transmitting the updated status of the command request to the second process in response to receiving, from the second process, a status request associated with the command request.

6. The method of claim 1, wherein the receiving the command request further comprises:
   receiving, from the second process comprising a Java application, the command request having a PowerShell script configured to be executed on the plurality of virtual machines.

7. A system for executing scripts on a plurality of virtual machines, comprising:
   one or more computer processors; and
   a memory containing a program which, when executed by the one or more computer processors, is configured to perform an operation comprising:
      loading, by a first process executing in the computer processor, a library configured to connect to a virtual management center and enable remote execution of a script on the plurality of virtual machines;
      establishing a connection to the virtual management center based on the loaded library;
      receiving, from a second process executing in the computer processor, a command request having a script and specifying at least one target virtual machine of the plurality of virtual machines on which to invoke the script;
      responsive to determining an agent is available on the target virtual machine, storing the received command request associated with the target virtual machine in a command queue; and
      responsive to determining an agent is not available on the target virtual machine, invoking execution of the script on the target virtual machine using the connection to the virtual management center.

8. The system of claim 7, wherein the operation further comprises:
   responsive to receiving a check-in request from an agent executing in a virtual machine, determining whether any command requests associated with the virtual machine are available in the command queue; and
   transmitting, to the agent executing in the virtual machine, at least one script associated with the command requests retrieved from the command queue.

9. The system of claim 8, wherein the determining whether any command requests associated with the target virtual machine further comprises:
   identifying any command requests having a target identifier matching the virtual machine of the check-in request;
   identifying any command requests configured for multicast operation and having a target identifier matching at least a portion of the virtual machine of the check-in request; and
   identifying any command requests configured for broadcast operation.

10. The system of claim 7, wherein the operation further comprises:
    receiving, from the target virtual machine, script output resulting from execution of the script on the target virtual machine;
    modifying the command queue to update a status of the command request and store the script output.

11. The system of claim 10, wherein the operation further comprises:
    transmitting the updated status of the command request to the second process in response to receiving, from the second process, a status request associated with the command request.

12. The system of claim 7, wherein the receiving the command request further comprises:
    receiving, from the second process comprising a Java application, the command request having a PowerShell script configured to be executed on the plurality of virtual machines.

13. A non-transitory computer-readable storage medium having computer-readable program code embodied therewith, the computer-readable program code comprising:
    computer-readable program code configured to load, by a first process, a library configured to connect to a virtual management center and enable remote execution of a script on a plurality of virtual machines;
    computer-readable program code configured to establish a connection to the virtual management center based on the loaded library;
    computer-readable program code configured to receive, from a second process, a command request having a script and specifying at least one target virtual machine of the plurality of virtual machines on which to invoke the script;

computer-readable program code configured to, responsive to determining an agent is available on the target virtual machine, store the received command request associated with the target virtual machine in a command queue; and computer-readable program code configured to, responsive to determining an agent is not available on the target virtual machine, invoke execution of the script on the target virtual machine using the connection to the virtual management center.

14. The non-transitory computer-readable storage medium of claim 13, further comprising:

computer-readable program code configured to, responsive to receiving a check-in request from an agent executing in a virtual machine, determine whether any command requests associated with the virtual machine are available in the command queue; and computer-readable program code configured to transmit, to the agent executing in the virtual machine, at least one script associated with the command requests retrieved from the command queue.

15. The non-transitory computer-readable storage medium of claim 14, wherein the computer-readable program code configured to determine whether any command requests associated with the target virtual machine further comprises:

computer-readable program code configured to identify any command requests having a target identifier matching the virtual machine of the check-in request;

computer-readable program code configured to identify any command requests configured for multicast operation and having a target identifier matching at least a portion of the virtual machine of the check-in request; and computer-readable program code configured to identify any command requests configured for broadcast operation.

16. The non-transitory computer-readable storage medium of claim 13, further comprising:

computer-readable program code configured to, receive, from the target virtual machine, script output resulting from execution of the script on the target virtual machine; and computer-readable program code configured to modify the command queue to update a status of the command request and store the script output.

17. The non-transitory computer-readable storage medium of claim 16, further comprising:

computer-readable program code configured to transmit the updated status of the command request to the second process in response to receiving, from the second process, a status request associated with the command request.

18. The non-transitory computer-readable storage medium of claim 13, wherein the computer-readable program code configured to receive the command request further comprises:

computer-readable program code configured to receive, from the second process comprising a Java application, the command request having a PowerShell script configured to be executed on the plurality of virtual machines.

* * * * *